Figure 1:
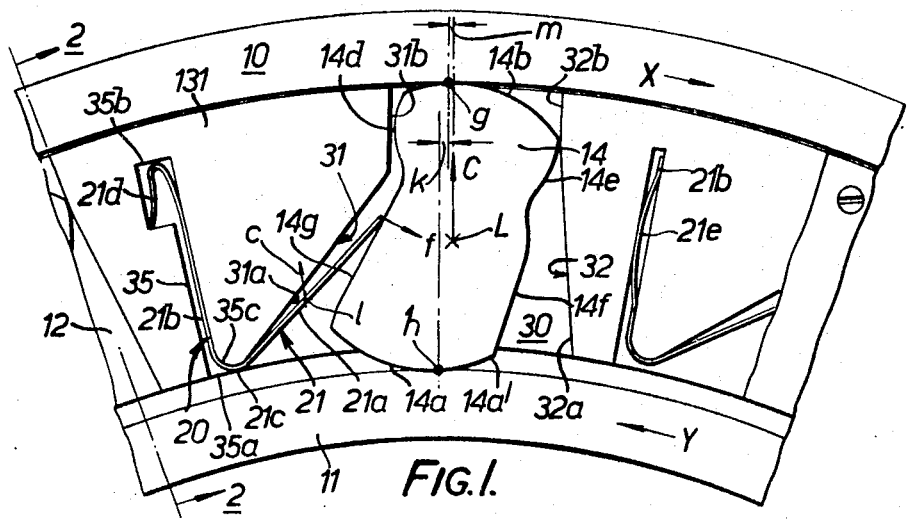

United States Patent
Oldfield

[15] 3,651,908
[45] Mar. 28, 1972

[54] SPRAG CLUTCHES

[72] Inventor: Benjamin D. Oldfield, Cheadle Hulme, England

[73] Assignee: Renold Limited, Wythenshawe, Manchester, England

[22] Filed: June 1, 1970

[21] Appl. No.: 42,433

[30] Foreign Application Priority Data

June 6, 1969 Great Britain.....................28,832/69

[52] U.S. Cl. ..........................................192/45.1, 192/41 A
[51] Int. Cl. .....................................................F16d 41/07
[58] Field of Search ......................192/41 A, 45.1; 188/82.8

[56] References Cited

UNITED STATES PATENTS

| | | | |
|---|---|---|---|
| 3,219,163 | 11/1965 | Zlotek | 192/45.1 |
| 2,750,019 | 6/1956 | Ferris | 192/45.1 |

FOREIGN PATENTS OR APPLICATIONS 740,201  1/1954  Great Britain

Primary Examiner—Allan D. Herrmann
Attorney—Flynn & Frishauf

[57] ABSTRACT

A sprag clutch in which the forces on the sprags during outer race over running give rise to only a small but positive rubbing load between the sprags and the inner race at all outer race over running speeds within a designed limit.

27 Claims, 6 Drawing Figures

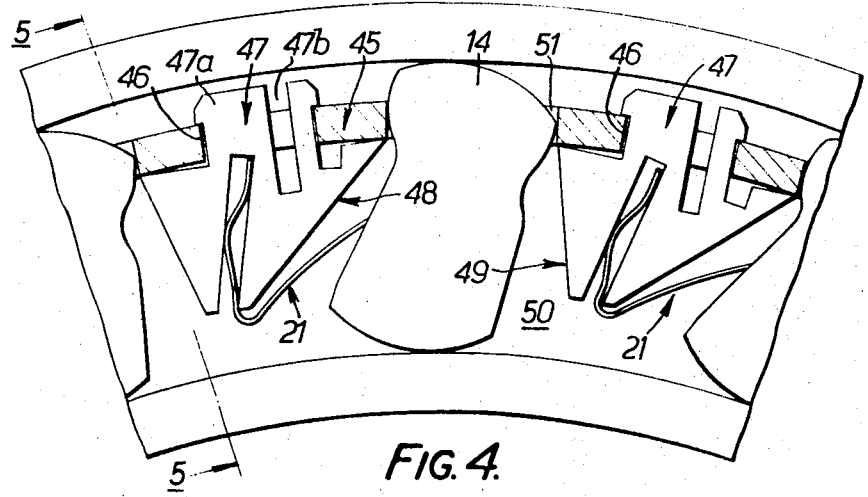
FIG. 4.
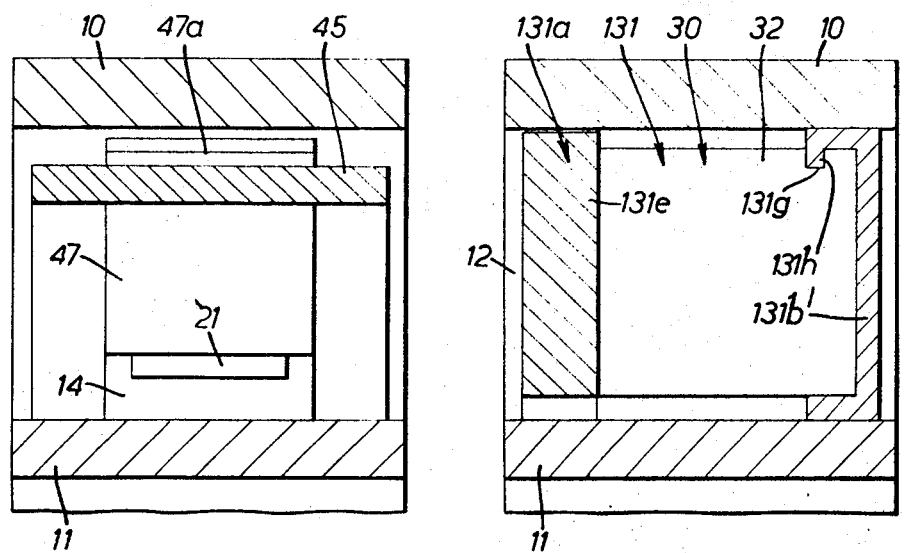
FIG. 5.
FIG. 6.

SPRAG CLUTCHES

This invention comprises improvements in or relating to sprag clutches and concerns sprag-retainer assemblages for sprag clutches.

An object of this invention is to provide an improved sprag-retainer assemblage for a sprag clutch, for use in transmitting a uni-directional drive between inner and outer races of the clutch, the clutch having an improved outer race over-running speed compared with its inner race over-running speed.

According to one aspect of this invention there is provided a sprag retainer assembly for use in a sprag clutch, in an annular gap between inner and outer races of the clutch to transmit uni-directional drive between the clutch driving and driven race, the assemblage comprising an annular sprag retainer, a ring of sprags in the retainer, and, for each sprag, an energising spring individual to the sprag for biasing the sprag into substantially line contact with the inner race of the clutch, by tilting the sprag about substantially a line of contact with the outer race of the clutch, with a component of spring force directed radially inwardly of the assemblage, whereby the centrifugal force acting on the spring during over-running of the outer race of the clutch relieves the spring force on the sprag, the centre of gravity of each sprag being disposed close to or in the radial axial plane of the assemblage containing said line of contact between said sprag and the outer race during over-running of the outer race of the clutch such that the centrifugal force acting on the sprag during over-running of the outer race of the clutch acts in conjunction with the spring force on the sprag so as to maintain a small but positive load between the sprag and the inner race on over run of the outer race, at least within a predetermined limit of outer race over-running speed.

It will be understood that during over-running of the outer race of the clutch, the sprag retainer, the sprags, the springs and the outer race all rotate whilst sprags rub on the inner race with the inner race remaining, for example, stationary.

It may be arranged that the centrifugal force acting on each sprag during over-running of the outer race of the clutch passes through said line of contact of the sprag with the outer race of the clutch or to that side of said line such as to oppose the spring force tending to tilt the sprag about said line, as aforesaid.

Preferably, each spring is a blade spring.

Preferably also the blade spring comprises a lightweight, elongated arm anchored at one end, the other, free end of the arm engaging the sprag.

By decreasing the load between each sprag and the inner race during over-running of the outer race or by minimising the increase of load between each sprag and the inner race during over-running of the outer race, the permitted over-running speed of the outer race compared with the inner race over-running speed, may be increased.

The use of an individual, lightweight spring to energise each sprag, in itself, decreases the load between the sprag and the inner race during over-running of the outer race compared with the case where the more massive, conventional garter spring is used to energise all the sprags in unison. By arranging each individual spring so that the action of centrifugal force on the spring relieves the spring force, a positive contribution is made to the relief of the load between the sprag and the inner race during over-running of the outer race. Whilst still further load relief may be achieved by proper positioning of the centre of gravity of the sprag, it is necessary to ensure that each sprag is always biased into contact with the inner race sufficiently so as not to tend to lift off the race even during maximum designed over-running of the outer race. To accommodate high speed over-running of the outer race, therefore, it is preferred to position the centre of gravity of the sprag so that the mass of the sprag always assists the spring in energising the sprag.

In order to improve the resistance to sprag "turnover" and sprag "popout," the sprags may be positioned each in a separate compartment in the sprag retainer having oppositely facing circumferentially spaced bounding faces which cooperate with one another, in use of the assemblage, to prevent rotation of the sprag in either direction to a position beyond a limiting position in which it can move out of driving contact with the inner and outer races.

The phenomenon of sprag "turnover" relates to the tendency of one or more of the sprags to roll over fully or beyond a permissible limit on a driving race under certain conditions, for example, a momentary torque overload, such that the driving race slides past the sprags, the sprags no longer transmitting the drive.

The phenomenon of sprag "popout" has a similar effect, the sprags being caused to unroll in the opposite sense under certain conditions, for example, due to a sudden release of torque load, whereby again the driving race slides past the sprags, the sprags no longer transmitting drive.

Preferably, said oppositely facing bounding faces define a funnel shape in radial planes normal to the axis of the assemblage, the faces having portions converging radially outwardly to substantially parallel portions thereof which portions cooperate with curved surface portions of the sprag to position the sprag circumferentially relative to the other sprags in use of the assemblage.

Preferably also, said funnel shape is assymetrical, being enlarged on that side of the axial radial plane of the assemblage which contains the centre of gravity of the sprag which is remote from the low corner of the radially inner end face of the sprag in use of the assemblage.

The sprags and the retainer may have interlocking formations which are urged into interlocking engagement with one another by the springs individual to the sprags so long as the assemblage is free of any races, the interlocking formations then resisting radially inward or radially outward displacement of the sprags with respect to the retainer.

According to a further feature of this invention, the retainer is formed as or comprises a moulding.

According to a further feature of the invention, the retainer is formed as or comprises a plastics moulding.

According to a still further feature of this invention, the retainer comprises an annular body and an annular end piece fixed to the body, the end piece defining one of two axially spaced bounding faces of each compartment of the retainer.

According to a still further feature of this invention the retainer comprises a cage having a circumferentially extending row of window openings in alternate ones of which inserts are mounted to define portions of said oppositely facing bounding faces of said compartments, the sprags being located one in each of the other window openings.

Thus, the inserts may define radially outwardly converging portions of said oppositely facing bounding faces of said compartments, the window openings containing the sprags presenting said substantially parallel portions of said oppositely facing bounding faces.

According to a still further feature of the invention, the cage is of metal and the inserts are of plastics material, e.g. plastics mouldings.

According to a still further feature of the invention, the inserts are composed of an extruded section of plastics material.

Figure 2:
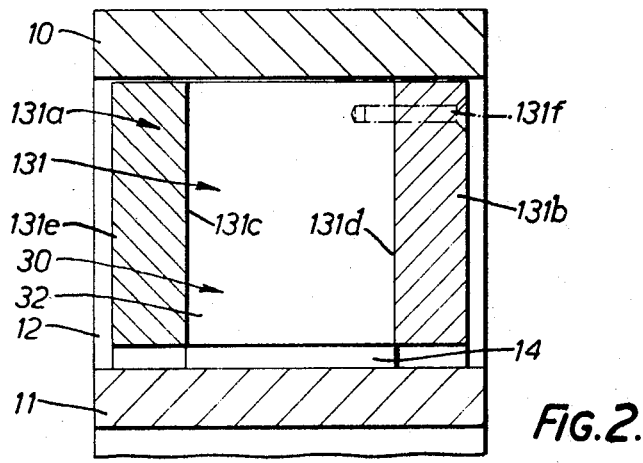
Figure 3:
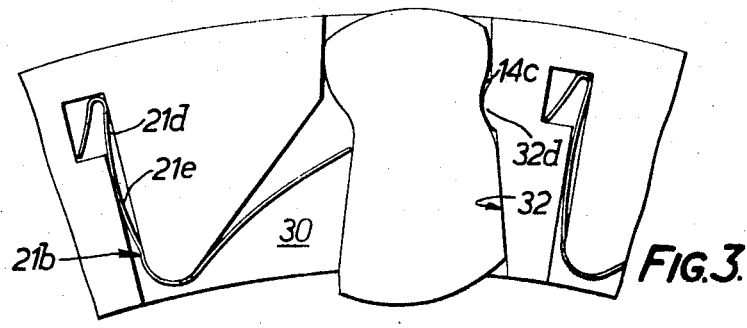

Specific embodiments of the present invention will now be described by way of example with reference to the accompanying drawings in which:

FIG. 1 shows a circumferential portion of a sprag clutch employing a sprag-retainer assemblage according to this invention having alternative forms of spring means, FIG. 2 is a view on line 2—2 in FIG. 1, FIG. 3 shows a modification of the sprag-retainer assemblage shown in FIG. 1, FIG. 4 shows a circumferential portion of a sprag clutch employing a further sprag-retainer assemblage according to this invention, FIG. 5 is a view on line 5—5 in FIG. 4, and FIG. 6 is a view corresponding with FIG. 2 and showing a modification of the retainer of the sprag-retainer assemblage of FIG. 1.

Referring to FIGS. 1 and 2, the clutch comprises, in well known fashion, outer and inner races 10 and 11 with an annular gap 12 between them containing a ring of sprags 14 arranged circumferentially in the gap 12 and correspondingly tilted with respect to the radial directions, generally in the attitude depicted.

The radially inner and outer end faces 14a and 14b of the sprags are shaped by radii or compound radii and the tilt of the sprags is such that the radially inner end face of each sprag has one low corner 14a'. The overall shape of the sprags is such that as the sprags tend to assume a more exactly radial disposition, the overall radial height of the sprags increases and tends to become greater than the width of the gap 12 so that the sprags lock solidly between the races to transmit drive from the driving race to the driven race.

Spring means generally indicated at 20 is provided to energise or bias the sprags lightly into contact with the inner and outer races when the races are stationary.

The spring means consists of a blade spring 21 individual to each sprag 14. The spring has an elongate, lightweight arm 21a anchored at one, radially inner end and extending outwardly in the gap 12 at an angle to the radial direction to its other, free end which engages the sprag. The blade spring 21 thus exerts a small force $f$ on the sprag, in the gap between the races 10 and 11 with a component directed radially inwardly of the races. The force $f$ biases the radially inner end face 14a of the sprag into substantially line contact with the inner race 11, at $h$, the force $f$ tending to tilt the sprag about substantially a line of contact $g$ between the radially outer end face 14b of the sprag and the outer race 10.

When the inner race overruns, it rotates in the direction indicated by the arrow Y and the sprags and the outer race remain stationary. Light rubbing takes place at $h$ but fairly high relative surface speeds at $h$ are possible.

When the outer race overruns, it rotates in the direction indicated by the arrow X and takes with it the sprags and the other parts disposed in the gap 12 between the races, only the inner race remaining stationary. The arm 21a of the blade spring 21 is urged radially outwardly by centrifugal force $c$ acting through the centre of gravity $l$ of the arm thus relieving the spring force $f$ on the sprag, and in consequence reducing the force at $h$ due to the action of the blade spring.

The centre of gravity of the sprag is indicated at L. During overrunning of the outer race, the centrifugal force on the sprag increases the force at $h$ in the proportion $mC/k$. However, this increase may be compensated in whole or in part by the reduction of force at $h$ due to the relief of the spring force, with the result that the rubbing which takes place at $h$ during overrunning of the outer race is not sufficient to limit the permissible outer race overrunning speed undesirably.

If necessary the centre of gravity L of each sprag may be shifted by redesign of the sprag so that the centrifugal force C acts through the line of contact $g$, so as to neutralise the effect of the mass of the sprag on the rubbing at $h$ during overrunning of the outer race.

Again, the centre of gravity L of each sprag may be shifted by redesign of the sprag so that the centrifugal force C opposes the spring force $f$ tending to tilt the sprag about the line of contact $g$.

However, it is required that the sprag be positively biased into engagement with the inner race under all operating conditions.

The sprags 14 are loosely contained each in a compartment 30 in an annular retainer generally indicated at 131 which is positioned in the gap 12.

The compartment 30 has oppositely facing bounding faces 31 and 32 circumferentially spaced in the gap 12 and cooperating with one another to prevent rotation of the sprag, in either direction, to a position beyond a limiting position in which it can move out of driving engagement with the inner and outer races. Thus sprag "turnover" and sprag "popout" are substantially prevented.

The faces 31 and 32 extend axially and each is composed of portions in two planes intersecting along an axially extending line, the faces at first converging in the radially outward direction from the inner circumference of the retainer means, as at 31a and 32a, and then extending generally parallel with one another and generally radially outwardly as at 31b and 32b so as to define a compartment which is of rectangular section in circumferential planes and of assymetrical funnel shape in radial planes normal to the axis of the clutch, the compartment being enlarged to that side of the axial radial plane of the clutch and sprag-retainer assemblage passing through the centre of gravity L of the sprag which is remote from the low corner 14a' of its radially inner end face.

The faces 31 and 32 are shaped and disposed to limit the free movement of the sprag to an amount only slightly more than the movement required by the sprag during its normal working life.

The parallel portions 31b and 32b of the faces 31 and 32 respectively confront oppositely facing curved surface portions 14d and 14e of the sprag and act always to position the sprag circumferentially with respect to the other sprags. These face portions also act to maintain the sprag with its tilt axis parallel with the axis of the clutch. Thus the face portions 31b and 32b perform the function of the usual cage.

In its two limiting positions, the sprag engages the face portions 31b and 32a and the face portions 32b and 31a respectively. In the former position the surface portion 14d engages the face portion 31b and a flat surface portion 14f of the sprag lies flat against the face portion 32a. In the latter position the surface portion 14e engages the face portion 32b and a flat surface portion 14g of the sprag lies flat against the face portion 31a with the blade spring arm 21a sandwiched between those faces.

The blade spring 21 is mounted in an axially and radially extending pocket 35 in the retainer, on the trailing side of the pocket with respect to the direction of rotation X, the pocket having a slot-like mouth 35a at the inner circumference of the retainer adjacent the face 31 and extending radially outwardly therefrom to a blind, enlarged end 35b. A part-cylindrical surface 35c of the retainer means defines the axially disposed side edge of the mouth 35a adjacent the face 31. The spring 21 is of U-shape comprising a further straight arm 21b joined by a rounded portion 21c with the arm 21a and the portion 21c fits snugly against the surface 35c. The arm 21b has a hooked portion 21d at its free end locked in the end 35b of the pocket.

The arm 21a is made as long as possible and may have a length equal to that of the surface portion 31a as measured in the radially outward direction. By providing a long arm 21a the fatigue at the rounded portion 21c is reduced.

In an alternative arrangement of spring shown on the right hand side in FIG. 1, the spring arm 21b in the pocket has an intermediate bowed portion 21e which acts to retain the spring in the pocket and in this case, the blind end of the pocket is not enlarged.

In a still further arrangement of spring shown in FIG. 3, the spring arm 21b of the blade spring has a bowed portion 21e and a hooked free end portion 21d to retain the spring in the pocket.

Also, as shown in FIG. 3, the sprags and the retainer may have interlocking formations which are urged into interlocking engagement with one another by the springs individual to the sprags, when the sprag-retainer assemblage is free of the races as shown in FIG. 3, thus to prevent radially inward or outward displacement of the sprags with respect to the retainer. Thus the face 32 of each compartment of the retainer means may have an axially extending part-cylindrical bead 32d formed at the junction of its intersecting surfaces and the adjacent sprag face may have a corresponding axially extending smoothly curved concavity 14c to engage the bead. The sprag is urged by its spring against the face 32 to engage the interlocking formations 32d, 14c when the sprag is mounted in the retainer.

The arrangement prevents the sprags escaping out of the compartments 30 during assembly of the clutch.

The arrangement of the interlocking means may be such that the sprags can be assembled in the compartments only in the axial direction.

The retainer 131 comprises an annular body 131a, having the compartment defining faces 31, 32, and a separate annular end piece 131b fixed to the body and defining one of two axially spaced bounding faces 131c and 131d of each compartment, the other of which is defined by an end piece 131e formed integrally with the annular body 131a. The sprags would be assembled axially into the compartments in the body and the separate annular end piece 131b then fixed to the body 131a by fastenings such as screws 131f or clips or again by being glued to the body, for example.

The outer diameter of the retainer is a running fit in the outer race 10 and this centers the sprag retainer assemblage with respect to the inner and outer races.

In a modification, as shown in FIG. 6, the annular body 131a has a discontinuous circumferential groove 131g encircling, and formed in, the portions of the body presenting the faces 31, 32 and the separate annular end piece 131b' is formed with a circumferential lip 131h. The body 131a is sufficiently flexible to allow the groove 131g to be contracted by contraction of the portions of the body presenting the faces 31, 32, thereby to receive the lip 131h and attach the body to the separate annular end piece.

As also shown in FIG. 6, the separate annular end piece may have its inner as well as its outer diameter a close running fit to the outer and inner races 10 and 11 thus acting as a bearing and maintaining their concentricity as well as centering the sprag retainer assemblage with respect to the inner and outer races. For this purpose the separate end piece is made of phosphor bronze.

A separate end piece may be dispensed with altogether, the open side of the retainer being closed by an existing shoulder or abutment of another component of the equipment incorporating the retainer assemblage.

The annular body 131a and the separate end piece 131b are formed as plastic mouldings. Conveniently they are formed from nylon loaded with glass fibre and graphite to provide strength and thermal stability.

The arms 21b of the sprags 21 may be moulded in the retainer body 131a in a further modified arrangement.

With the design of sprag-retainer assemblage described, the number of sprags may be readily varied for a given diameter of clutch so as to relate the number of sprags exactly to the torque capacity required.

For a large torque capacity a number of the sprag-retainer assemblages may be incorporated axially side-by-side between common inner and outer races.

The use of individual springs permits a slight eccentricity between the inner and outer races to be accommodated up to an amount limited by contact between any one sprag and the faces 31 and 32 of its compartment of the retainer means. Once such eccentricity occurs, of course, the clutch requires overhaul.

The retainer body 131a may alternatively be made from metal.

Because of the provision and form of the individual springs the sprags do not need to be slotted to form spring abutments on the sprags, as when a single garter spring is used to energise all the sprags in unison. The sprags are, therefore, more cheaply produced in this respect.

FIGS. 4 and 5 show an alternative construction of sprag-retainer assemblage of this invention in a sprag clutch in which the retainer is made up of a cage ring 45 having a circumferentially extending row of window openings in alternate ones 46 of which are mounted inserts 47 to define circumferentially spaced oppositely facing bounding faces 48, 49 of compartments 50 loosely containing the sprags 14. The sprags are located one in each of the other window openings 51 of the cage ring.

The cage ring 45 acts in the conventional manner to space out the sprags and maintain them in their spaced relation whilst the inserts 47, which are all of identical shape in cross-section, act in concert with the cage ring substantially to prevent "turnover" and "popout" of the sprags.

The arrangement of the springs 21 is as previously described.

The inserts 47 may be formed as an extruded section of plastics material. Each comprises a flanged stud formation 47a which is slotted in the axial direction as at 47b to allow contraction of the stud circumferentially to force it through the window opening 46.

The cage ring 45 is conveniently of metal and may comprise a windowed strip which has been cropped to length, coiled and riveted or otherwise fastened e.g., by welding into a ring. Alternatively the cage ring may comprise a pressed out ring suitably pierced to form the windows.

Instead of being extruded, the inserts 47 may be moulded individually from plastics material.

I claim:

1. A sprag-retainer assemblage for use in a sprag clutch, in an annular gap between inner and outer races of the clutch to transmit unidirectional drive between the clutch driving and driven race, the assemblage comprising an annular sprag retainer, a ring of sprags in the retainer, and, for each sprag an energising spring individual to the sprag for biasing the sprag into substantially line contact with the inner race of the clutch, by tilting the sprag substantially about a line of contact with the outer race of the clutch, with a component of spring force directed radially inwardly of the assemblage, such that the centrifugal force acting on the spring during over-running of the outer race of the clutch relieves the spring force on the sprag, the centre of gravity of each sprag being disposed close to or in the radial axial plane of the assemblage containing said line of contact between said sprag and the outer race during over-running of the outer race of the clutch such that the centrifugal force acting on the sprag during over-running of the outer race of the clutch acts in conjunction with the spring force on the sprag so as to maintain a small but positive load between the sprag and the inner race on over run of the outer race, at least within a predetermined limit of outer race over-running speed.

2. A sprag-retainer assemblage as claimed in claim 1 wherein the centrifugal force acting on each sprag during over-running of the outer race of the clutch passes through said line of contact of the sprag with the outer race of the clutch.

3. A sprag-retainer assemblage as claimed in claim 1 wherein the centrifugal force acting on each sprag during over-running of the outer race of the clutch passes to that side of said line of contact of the sprag with the outer race of the clutch such as to oppose the spring force tending to tilt the sprag about said line, as aforesaid.

4. A sprag-retainer assemblage as claimed in claim 1 wherein said spring is a blade spring.

5. A sprag-retainer assemblage as claimed in claim 4 wherein the blade spring comprises a lightweight, elongated arm anchored to the sprag retainer at one end, the other, free end of the arm engaging the sprag.

6. A sprag-retainer assemblage as claimed in claim 5 wherein said spring arm is anchored at its radially inner end, the arm extending outwardly at an angle to the radial direction to its other, free end which engages the sprag.

7. A sprag-retainer assemblage as claimed in claim 6 wherein the blade spring is of U-shape comprising a further elongated arm joined with said first said elongated arm at its radially inner end, and said further elongated arm is attached to the sprag retainer.

8. A sprag retainer as claimed in claim 7 wherein said further elongated arm is permanently attached to the retainer, for example, by being moulded-in.

9. A sprag retainer as claimed in claim 7 wherein said further elongated arm is removably attached to the retainer.

10. A sprag retainer as claimed in claim 9 wherein said further elongated arm makes interlocking engagement in an axially and radially extending pocket in the retainer.

11. A sprag-retainer assemblage as claimed in claim 1 wherein the sprags are positioned each in a separate compartment in the sprag retainer having oppositely facing circumferentially spaced bounding faces which co-operate with one another, in use of the assemblage, to prevent rotation of the sprag in either direction to a position beyond a limiting position in which it can move out of driving contact with the inner and outer races.

12. A sprag-retainer assemblage as claimed in claim 11 wherein said oppositely facing bounding faces define a funnel shape in radial planes normal to the axis of the assemblage, the faces having portions converging radially outwardly to substantially parallel portions thereof which portions co-operate with curved surface portions of the sprag to position the sprag circumferentially relative to the other sprags in use of the assemblage.

13. A sprag-retainer assemblage as claimed in claim 12 wherein said funnel shape is assymetrical, being enlarged on that side of the axial radial plane of the assemblage which contains the centre of gravity of the sprag which is remote from the low corner of the radially inner end face of the sprag in use of the assemblage.

14. A sprag-retainer assemblage as claimed in claim 12 wherein the sprags and the retainer have interlocking formations which are urged into interlocking engagement with one another by the springs individual to the sprags so long as the assemblage is free of any races, the interlocking formations then resisting radially inward or radially outward displacement of the sprags with respect to the retainer.

15. A sprag-retainer asemblage as claimed in claim 14 wherein the interlocking formations comprise, in each case, an axially extending part-cylindrical bead on the retainer and an axially extending smoothly curved concavity in the sprag.

16. A sprag retainer assemblage as claimed in claim 15 wherein the bead is formed at the junction of the surface portions of one of said oppositely facing bounding faces of the compartment in the sprag retainer containing the sprag.

17. A sprag-retainer assemblage as claimed in claim 1 wherein the retainer is formed as or comprises a moulding.

18. A sprag-retainer assemblage as claimed in claim 1 wherein the retainer is formed as or comprises a plastic moulding.

19. A sprag-retainer assemblage as claimed in claim 1 wherein the retainer comprises an annular body and an annular end piece fixed to the body, the end piece defining one of two axially spaced bounding faces of each compartment of the retainer.

20. A sprag-retainer assemblage as claimed in claim 19 wherein the end piece is removably fixed to the body.

21. A sprag-retainer assemblage as claimed in claim 20 wherein the body is flexible and the body and the end piece have a groove-and-lip connection engageable and disengageable by flexure of the body.

22. A sprag-retainer assemblage as claimed in claim 12 wherein the retainer comprises a cage ring having a circumferentially extending row of window openings in alternate ones of which inserts are mounted to define portions of said oppositely facing bounding faces of said compartments, the sprags being located one in each of the other window openings.

23. A sprag-retainer assemblage as claimed in claim 22 wherein the inserts define radially outwardly converging portions of said oppositely facing bounding faces of said compartments, the window openings containing the sprags presenting said substantially parallel portions of said oppositely facing bounding faces.

24. A sprag-retainer assemblage as claimed in claim 22 wherein the cage ring is of metal and the inserts are of plastic material e.g. plastic mouldings.

25. A sprag-retainer assemblage as claimed in claim 22 wherein the inserts are composed of an extruded section of plastic material.

26. A sprag clutch comprising inner and outer races defining an annular gap and a sprag-retainer assemblage in the annular gap to transmit unidirectional drive between the clutch driving and driven race, said assemblage comprising an annular sprag retainer, a ring of sprags in the retainer, and, for each sprag, an energising spring individual to the sprag and biasing the sprag into substantially line contact with the inner race of the clutch by tilting the sprag about substantially a line of contact with the outer race of the clutch, with a component of spring force directed radially inwardly of the clutch whereby the centrifugal force acting on the spring during over-running of the outer race of the clutch relieves the spring force on the sprag, the centre of gravity of each sprag being disposed close to or in the radial axial plane of the clutch containing said line of contact between said sprag and the outer race during over-running of the outer race of the clutch such that the centrifugal force acting on the sprag during over-running of the outer race of the clutch acts in conjunction with the spring force on the sprag so as to maintain a small but positive load between the sprag and the inner race on over run of the outer race, at least within a predetermined limit of outer race over-running speed.

27. A sprag-retainer assemblage as claimed in claim 12 wherein said spring is a blade spring which comprises a lightweight, elongated arm anchored to the sprag retainer at its radially inner end, said arm extending outwardly at an angle to the radial direction, the other, free end of said arm engaging the sprag.

* * * * *